P. C. TRAVER.
TIRE.
APPLICATION FILED FEB. 24, 1914.
1,137,930. Patented May 4, 1915.
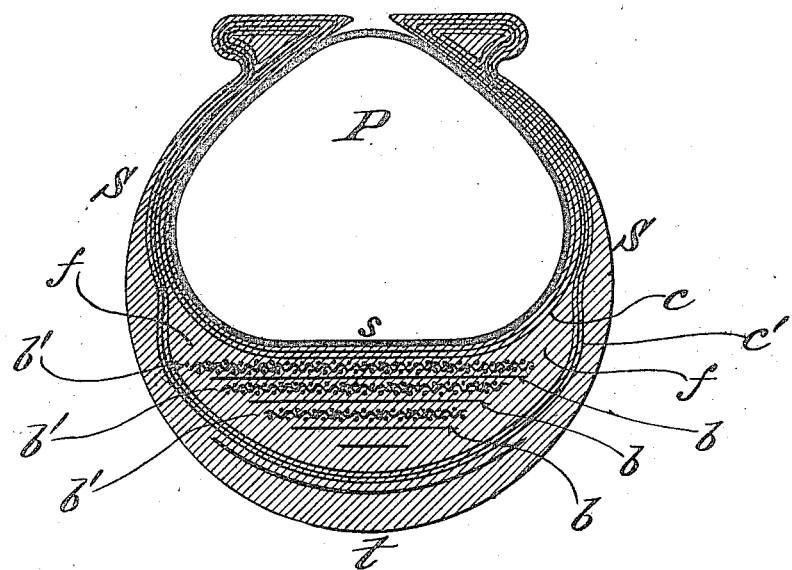
Witnesses:
Dorothy Miatt
P. F. Schrell
Inventor:
Philip C. Traver
By his Attorney
Geo. Wm Miatt

UNITED STATES PATENT OFFICE.

PHILIP C. TRAVER, OF FAR ROCKAWAY, NEW YORK, ASSIGNOR TO TRAVER PUNCTURE PROOF TIRE COMPANY INC., A CORPORATION OF NEW YORK.

TIRE.

1,137,930. Specification of Letters Patent. Patented May 4, 1915.

Application filed February 24, 1914. Serial No. 820,392.

*To all whom it may concern:*

Be it known that I, PHILIP C. TRAVER, a citizen of the United States, and a resident of Far Rockaway, county of Queens, and State of New York, have invented certain new and useful Improvements in Tires, of which the following is a specification.

My improvements relate to tires in which pneumatic tubes are used and the invention is designated not only to effectually protect the pneumatic tube against puncture but also to afford a greater margin of available wear for the tread,—by increasing the peripheral thickness of the tire between the pneumatic tube and the tread, thereby lengthening the life or run of the tire, all as hereinafter set forth.

The accompanying drawing represents a cross section of a clencher tire made in accordance with my invention.

In said drawing P, represents the ordinary pneumatic tube made of rubber and inflated in the usual way to fill and conform to the inner configuration of the outer casing or shoe S, which incloses and protects the pneumatic tube.

Heretofore so far as I am aware the space in the shoe or casing S, provided for the pneumatic tube P, has been circular in cross area, or essentially so, so that the thickness of material between the pneumatic tube and the tread $t$, has necessarily been comparatively slight and restricted within certain prescribed limits. Furthermore the "breakers" or protective and strengthening layers of fabric or other material interposed between the pneumatic tube P, and the tread $t$, had necessarily to be curved transversely to conform to the annular configuration of the pneumatic tube seat, and hence their flexibility and resilience to vertical tread strain was impaired.

An important feature of my invention consists in forming the shoe or casing S, with a pneumatic tire seat which is flat or approximately so on the side adjacent to the tread $t$, this truncated portion $s$, of the tube seat extending laterally across the cross section of the tire like a chord to the peripheral arch of the tread and affording an augmented area for the rubber filling or cushion $f$, in which the breakers $b$, may be embedded in lines substantially parallel to said chord or truncated portion $s$. As a result I am enabled not only to protect the pneumatic tube P, more effectually but also to attain a maximum of thickness of tread and double or triple the extent of wear of the tire,—the distance between the chord $s$, and the apex of the tread $t$, representing the available wear or life of the tire under ordinary conditions of use.

Another important feature of my invention is the manner in which the tire is built up and constructed, particularly the embedding within the cushion or filling $f$, between the chord $s$, and the tread $t$, of reinforcing woven wire breakers $b'$, $b'$, of the fabric set forth in my concurrent application No. 820,391 filed herewith, in which the distinctive feature is the embedding of woven wire cloth in rubber between layers of textile cloth to afford a flexible non-stretchable resilient puncture and moisture proof fabric adapted for use, among numerous other purposes, as a shield for pneumatic tubes.

In the formation of the tire, instead of using a former or core which is circular in cross section as heretofore, I use a core the cross section of which is represented by that of the pneumatic tube P, shown in the drawing, the truncated portion of the core representing and causing the chord $s$, as will be readily understood when it is stated that the casing S, is built up around the core in the usual manner by first applying one or more layers of woven textile cloth or fabric $c$, such as sea island fabric, friction cloth or the like. Interposed between these inner layers of textile fabric $c$, and the outer layers $c'$, thereof on the tread side of the casing S, is the rubber filling or cushion $f$, in which the "breakers" $b$, $b'$, are embedded. This construction is accomplished by first placing a layer of rubber against the part of the woven fabric $c$, forming the chord $s$, then applying a reinforcing layer of woven wire fabric $b'$, then a layer of rubber, next a layer of textile fabric $b$, and so on alternately until the desired number and thickness of "breakers" are incorporated in the filling cushion $f$, the "breakers" $b$, $b'$, thus being covered with and embedded in the said rubber cushion, which is then covered with one or more outer layers $c'$, of textile fabric, the tread $t$, applied, and the casing otherwise finished in the usual way.

As before intimated one or more of the woven wire reinforcing "breakers" $b'$, may thus be used, preferably three or more, alternating with the textile breakers $b$, as shown in the drawing. The flat, horizontal disposition of the "breakers" does not impair their flexibility and resilience as would be the case were they curved concentrically to an annular pneumatic tube and seat as heretofore. This consideration is of material consequence as related to my woven wire reinforcing "breakers" $b'$, $b'$, the lateral curvature of which would stiffen them both longitudinally and transversely and detract from their flexibility, which flexibility is an important factor in tires of this character where the desideratum is to protect the pneumatic tube without interfering with its elasticity and resilience.

Hence the truncated form $s$, of the pneumatic tube seat affords a double function in that it admits of the parallel annular cylindrical alinement of the breakers $b$, $b'$, and thus leaves their flexibility unimpaired, while at the same time it affords to all practical intents and purposes, an available tread of double or treble thickness as compared with tires as heretofore constructed, it being well known that as ordinarily used the tires are kept in service until the tread portions wear away to the pneumatic tube seat, or nearly so.

I thus obviously attain a tire of exceptional elasticity and resilience combined with greater strength and length of service or run, and at the same time by incorporating the metallic reinforcing wire fabric $b'$, in the tread cushion or filling $f$, I effectually guard the pneumatic tube against danger of puncture without materially or perceptibly increasing the weight of the tire or endangering its integrity. In other words my woven wire guard adapts itself perfectly to the flexure of the other component parts of the tread, whereas, metallic plates and shields inserted therein tend constantly to cut and disintegrate the tire. In fact my woven wire "breakers" $b'$, not only protect the tube against puncture but also being intimately incorporated and embedded in the structure, act as reinforcements and binders to strengthen and preserve the integrity of the tire as a unitary structure.

The flat parallel cylindrical disposition (considered annularly) of the chord $s$, and of the breakers $b$, $b'$, causes them to roll longitudinally with the tire without crowding or pinching or cutting the adjacent parts thereof, thereby obviating heating, strain, and frictional wear, and affording an easy running tire of maximum durability. In fact the gist of my invention consists in the construction of the tire with the annular cylindrical woven wire breakers $b'$, $b'$, arranged in conjunction with and parallel to the annular cylindrical chord $s$, of the pneumatic tube seat, whereby the breakers $b'$, roll "on the flat" without buckling,—my express object being to avoid the arching or lateral curvature of my woven wire reinforcements, which may be likened to flat flexible cylindrical hoops embedded in the tire, which protect the pneumatic tube P, without unduly stiffening the tire, as they would obviously do if curved laterally to conform in whole or in part to the exterior outline of the tread $t$, in cross section,—it being well known in practice that where laterally curved metallic reinforcements are used in tires the "buckling" of the metallic shields under stress of travel results in frictional heat and wear, and tends to disintegrate the tire. Hence, my flat parallel reinforcements effectually protect the pneumatic tube P, without interfering with or impairing the elasticity and resilience of the tire as a whole, at the same time obviating "buckling," heating and undue internal frictional wear of parts, and thus affording an easy running durable tire of long life and efficiency.

What I claim as my invention and desire to secure by Letters Patent is,

1. A tire shoe of the character designated, having an interior elastic filling cushion forming a seat for the pneumatic tube substantially flat on the side adjacent the tread, said seat consisting of a truncated portion of the shoe constituting in cross section a chord to the arch of the tread, and an annular reinforcement of woven wire cloth embedded in said cushion parallel to the truncated seat or chord and extending on the flat cylindrically around the shoe.

2. A tire shoe of the character designated provided with a flat annular cylindrical seat for the pneumatic tube on the side adjacent the tread, said seat consisting of a truncated portion of the shoe constituting in cross section a chord to the arch of the tread, an elastic filling cushion conforming the interior of the shoe to said seat, and a plurality of annular reinforcements of woven wire embedded in said cushion substantially parallel to the truncated seat or chord and extending on the flat cylindrically around the tire.

PHILIP C. TRAVER.

Witnesses:
 GEO. WM. MINTT,
 E. R. ABRAUN.